US011837956B2

(12) United States Patent
Akram et al.

(10) Patent No.: US 11,837,956 B2
(45) Date of Patent: Dec. 5, 2023

(54) SHORT DETECTION FOR INDUCTIVE SWITCHING CONVERTERS

(71) Applicant: Cirrus Logic International Semiconductor Ltd., Edinburgh (GB)

(72) Inventors: Hasnain Akram, Austin, TX (US); Graeme G. Mackay, Austin, TX (US); Lingli Zhang, Austin, TX (US); Ruoxin Jiang, Austin, TX (US); Sakkarapani Balagopal, Austin, TX (US); Theodore M. Burk, Cedar Park, TX (US)

(73) Assignee: Cirrus Logic Inc., Austin, TX (US)

( * ) Notice: Subject to any disclaimer, the term of this patent is extended or adjusted under 35 U.S.C. 154(b) by 55 days.

(21) Appl. No.: 17/478,433

(22) Filed: Sep. 17, 2021

(65) Prior Publication Data
US 2022/0231603 A1    Jul. 21, 2022

Related U.S. Application Data

(60) Provisional application No. 63/139,562, filed on Jan. 20, 2021.

(51) Int. Cl.
*H02M 1/32* (2007.01)
*H02M 3/158* (2006.01)
*H02M 1/00* (2006.01)

(52) U.S. Cl.
CPC ......... *H02M 3/158* (2013.01); *H02M 1/0009* (2021.05); *H02M 1/32* (2013.01)

(58) Field of Classification Search
CPC ....... H02M 3/158; H02M 1/0009; H02M 1/32
See application file for complete search history.

(56) References Cited

U.S. PATENT DOCUMENTS 10,361,554 B1 *   7/2019   Demski ................... H02M 1/32
10,644,598 B1 *   5/2020   Lewinski Komincz .....................
                                                              H02M 3/158
(Continued)

FOREIGN PATENT DOCUMENTS

CN        106330147 A      1/2017
CN        111391611 A      7/2020
(Continued)

OTHER PUBLICATIONS

International Search Report and Written Opinion of the International Searching Authority, International Application No. PCT/US2022/011819, dated May 19, 2022.
(Continued)

*Primary Examiner* — Kyle J Moody
*Assistant Examiner* — Jye-June Lee
(74) *Attorney, Agent, or Firm* — Jackson Walker L.L.P

(57) ABSTRACT

A method for determining if an inductor coupled to a switching network has been electrically shorted may include applying a voltage across the inductor for a predetermined period of time, controlling an impedance in an electrical path of a voltage source generating the voltage and the inductor, sensing an inductor current through the inductor, comparing the inductor current with a predetermined current threshold, and determining whether the inductor has been electrically shorted based on the inductor current, the predetermined current threshold, and the predetermined period of time.

20 Claims, 2 Drawing Sheets

(56) References Cited

U.S. PATENT DOCUMENTS 10,788,523 B1 * 9/2020 Michal ............... H02M 3/1582
2012/0139514 A1 6/2012 Paatero

FOREIGN PATENT DOCUMENTS

JP      2011200078 A    10/2011
KR     101239628 B1    3/2013

OTHER PUBLICATIONS

Yudhaprasetya, D. P. et al., "Optimal inductance and capacitance value approximation of boost topology DC to DC converter using transient analysis", Proceedings 2001 4th IEEE International Conference on Power Electronics and Drive Systems, 2001, Piscataway, NJ, vol. 1, Oct. 22, 2001, pp. 11-14.

* cited by examiner

SHORT DETECTION FOR INDUCTIVE SWITCHING CONVERTERS

RELATED APPLICATION

The present disclosure claims priority to U.S. Provisional Patent Application Ser. No. 63/139,562, filed Jan. 20, 2021, which is incorporated by reference herein in its entirety.

FIELD OF DISCLOSURE

The present disclosure relates in general to circuits for electronic devices, including without limitation personal audio devices such as wireless telephones and media players, and more specifically, to detect shorts in an inductive switching converter.

BACKGROUND

Personal audio devices, including wireless telephones, such as mobile/cellular telephones, cordless telephones, mp3 players, and other consumer audio devices, are in widespread use. Such personal audio devices may include circuitry for driving a pair of headphones or one or more speakers. Such circuitry often includes a speaker driver including a power amplifier for driving an audio output signal to headphones or speakers. Oftentimes, a power converter may be used to provide a supply voltage to a power amplifier in order to amplify a signal driven to speakers, headphones, other transducers, and/or other electronic components. A switching power converter is a type of electronic circuit that converts a source of power from one direct current (DC) voltage level to another DC voltage level. Examples of such switching DC-DC converters include but are not limited to a boost converter, a buck converter, a buck-boost converter, an inverting buck-boost converter, and other types of switching DC-DC converters. Thus, using a power converter, a DC voltage such as that provided by a battery may be converted to another DC voltage used to power the power amplifier.

Power converters are often implemented as inductive switching converters comprising an arrangement of switches and an inductor, whereby the switches are controlled (e.g., by limiting current through the inductor and/or another parameter of the converter) in a series of phases in which the inductor is periodically charged (a charging phase) and discharged (a transfer phase) to regulate a converter output at a desired voltage level.

Often, it is desirable to detect overcurrent conditions in an inductive switching converter which may be indicative of a soft or hard short of the inductor. Detection of shorts may be important as shorts may impose excessive current transients on a battery. Shorts may also damage devices and/or electrical traces in the shorted current path, cause overvoltage conditions at an output of a buck converter, and/or cause back powering of a power supply in a boost converter. Traditional approaches to detecting shorts in a current-mode controlled inductive switching converter include detecting for an overcurrent condition at the beginning of each charging phase. However, such approach has many disadvantages.

First, because normal operation of the current-mode controlled inductive switching converter in each switching cycle may begin only after the overcurrent detection window, which takes up a portion of the charging phase, switching cycles are limited to a minimum duty cycle. In addition, using this traditional approach, soft shorts (e.g., inductance greater than 20 nH) may not be reliably detected, as a large change in detected current over time may be required to reach the overcurrent threshold within the relatively small detection window. In addition, with using traditional approaches, a short may only be detected during a discharging phase, which may occur late, after potential damage may have already been incurred in a previous charging phase.

SUMMARY

In accordance with the teachings of the present disclosure, one or more disadvantages and problems associated with existing approaches to operating a power converter may be reduced or eliminated.

In accordance with embodiments of the present disclosure, a method for determining if an inductor coupled to a switching network has been electrically shorted may include applying a voltage across the inductor for a predetermined period of time, controlling an impedance in an electrical path of a voltage source generating the voltage and the inductor, sensing an inductor current through the inductor, comparing the inductor current with a predetermined current threshold, and determining whether the inductor has been electrically shorted based on the inductor current, the predetermined current threshold, and the predetermined period of time.

In accordance with these and other embodiments of the present disclosure, a method for estimating an inductance of an inductor may include applying a voltage across the inductor for a maximum period of time, controlling an impedance in an electrical path of a voltage source generating the voltage and the inductor, sensing an inductor current through the inductor, measuring a duration of time for the inductor current to reach the predetermined current threshold, and estimating the inductance based on the duration of time, the impedance, and the voltage.

In accordance with these and other embodiments of the present disclosure, a system for determining if an inductor coupled to a switching network has been electrically shorted may include an input for sensing an inductor current through the inductor and a control circuit configured to apply a voltage across the inductor for a predetermined period of time, control an impedance in an electrical path of a voltage source generating the voltage and the inductor, compare the inductor current with a predetermined current threshold, and determine whether the inductor has been electrically shorted based on the inductor current, the predetermined current threshold, and the predetermined period of time.

In accordance with these and other embodiments of the present disclosure, a system for estimating an inductance of an inductor may include an input for sensing an inductor current through the inductor and a control circuit configured to apply a voltage across the inductor for a maximum period of time, control an impedance in an electrical path of a voltage source generating the voltage and the inductor, measure a duration of time for the inductor current to reach the predetermined current threshold, and estimate the inductance based on the duration of time, the impedance, and the voltage.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
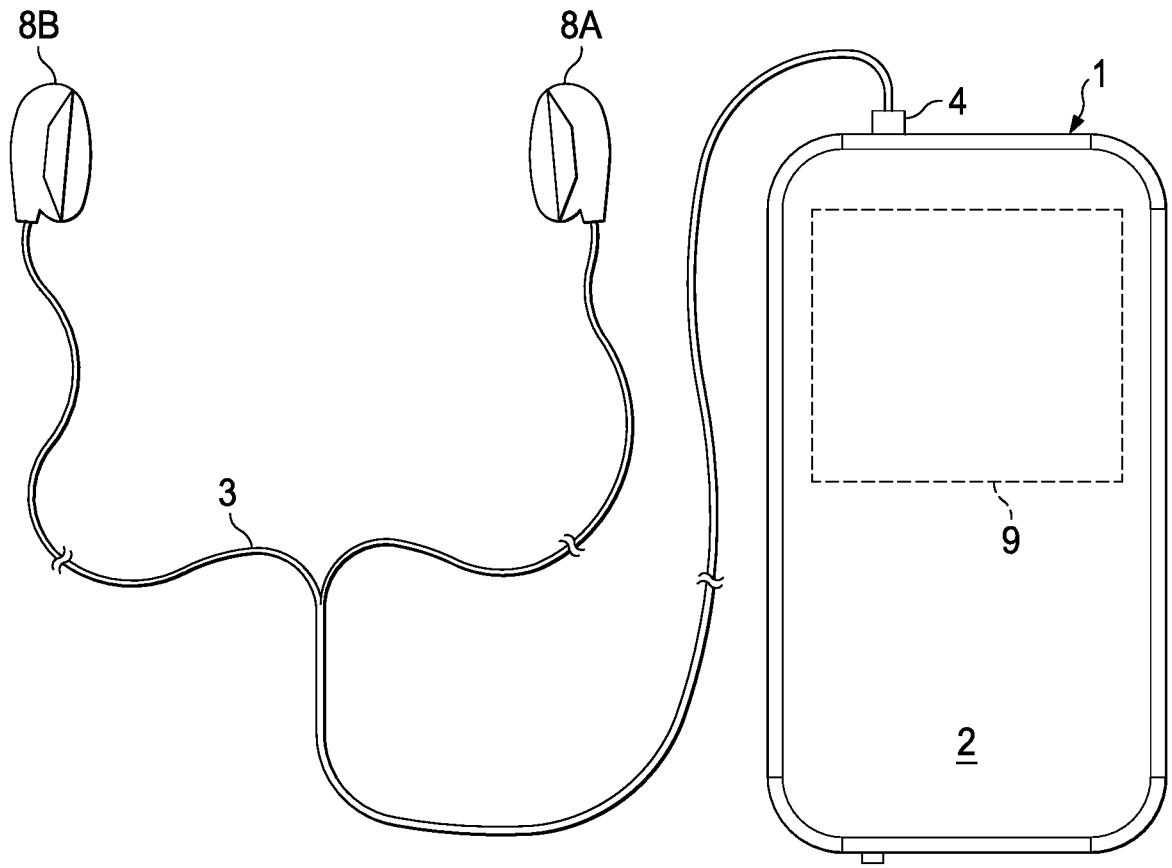
FIG. 1 illustrates an example personal audio device, in accordance with embodiments of the present disclosure.

FIG. 1 illustrates an example personal audio device 1, in accordance with embodiments of the present disclosure. FIG. 1 depicts personal audio device 1 coupled to a headset 3 in the form of a pair of earbud speakers 8A and 8B. Headset 3 depicted in FIG. 1 is merely an example, and it is understood that personal audio device 1 may be used in connection with a variety of audio transducers, including without limitation, headphones, earbuds, in-ear earphones, and external speakers. A plug 4 may provide for connection of headset 3 to an electrical terminal of personal audio device 1. Personal audio device 1 may provide a display to a user and receive user input using a touch screen 2, or alternatively, a standard liquid crystal display (LCD) may be combined with various buttons, sliders, and/or dials disposed on the face and/or sides of personal audio device 1. As also shown in FIG. 1, personal audio device 1 may include an audio integrated circuit (IC) 9 for generating an analog audio signal for transmission to headset 3 and/or another audio transducer.

Figure 2:
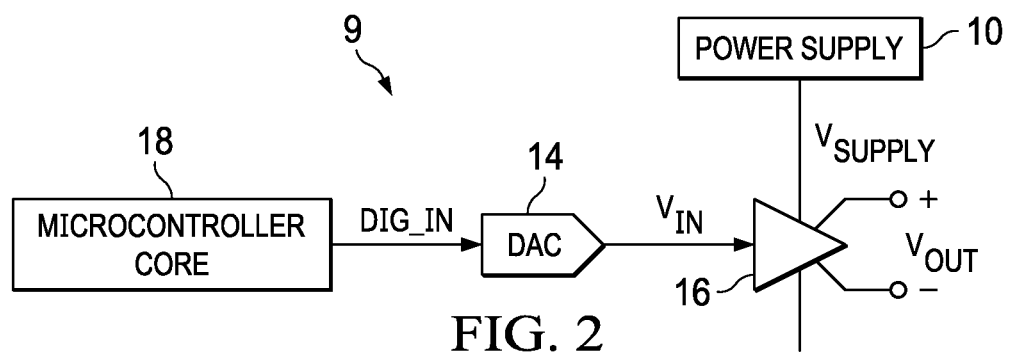
FIG. 2 illustrates a block diagram of selected components of an example integrated circuit of a personal audio device, in accordance with embodiments of the present disclosure.

FIG. 2 illustrates a block diagram of selected components of an example IC 9 of a personal audio device, in accordance with embodiments of the present disclosure. In some embodiments, example IC 9 shown in FIG. 2 may be used to implement IC 9 of FIG. 1. As shown in FIG. 2, a microcontroller core 18 may supply a digital input signal DIG_IN to a digital-to-analog converter (DAC) 14, which may convert the digital input signal to an analog signal $V_{IN}$. DAC 14 may supply analog signal $V_{IN}$ to an amplifier 16 which may amplify or attenuate input signal $V_{IN}$ to provide a differential output signal $V_{OUT}$, which may operate a speaker, a headphone transducer, a line level signal output, and/or other suitable output. In some embodiments, DAC 14 may be an integral component of amplifier 16. A power supply 10 may provide the power supply rail inputs of amplifier 16. In some embodiments, power supply 10 may comprise a switched-mode power converter, as described in greater detail below. Although FIGS. 1 and 2 contemplate that IC 9 resides in a personal audio device, systems and methods described herein may also be applied to electrical and electronic systems and devices other than a personal audio device, including systems for use in a computing device larger than a personal audio device, such as an automobile, a building, or other structure. Further, systems and methods described herein may also be applied to electrical and electronic systems and devices other than audio devices and audio transducers, such as vibrio-haptic transducers, piezoelectric transducers, or other transducers.

Figure 3:
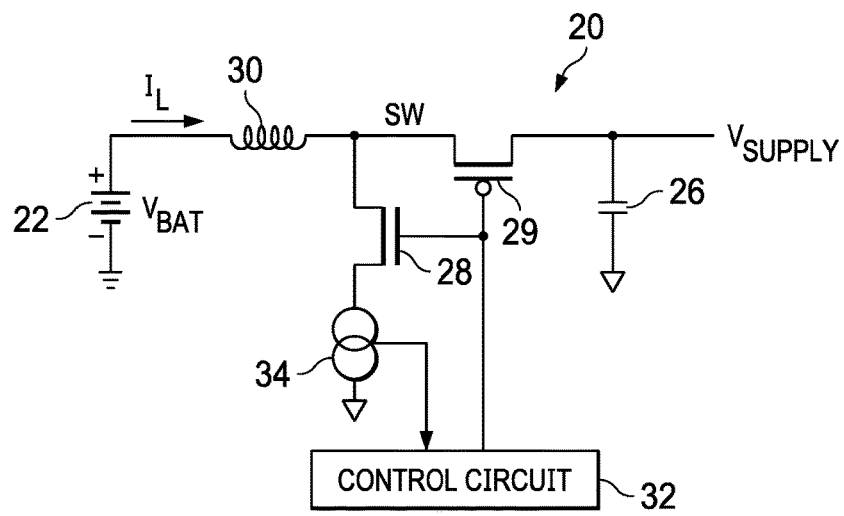
FIG. 3 illustrates a block diagram of selected components of an example boost converter which may be used to implement the power supply shown in FIG. 2, in accordance with embodiments of the present disclosure.

FIG. 3 illustrates a block diagram of selected components of an example boost converter 20 which may be used to implement power supply 10 shown in FIG. 2, in accordance with embodiments of the present disclosure. As shown in FIG. 3, boost converter 20 may include a battery 22, a power inductor 30, a switch 28 (which in some embodiments may be implemented as an n-type metal-oxide-semiconductor field-effect transistor (NFET)), a switch 29 (which in some embodiments may be implemented as a p-type metal-oxide-semiconductor field-effect transistor (PFET)), a boost capacitor 26, a control circuit 32, and a current sensor 34.

In normal operation of a switching cycle of boost converter 20, control circuit 32 may cause switch 28 to be activated (e.g., closed, turned on, enabled) and switch 29 to be deactivated (e.g., opened, turned off, disabled). Thus, during the first phase, a switch node (labeled as "SW" in FIG. 3) may be effectively shorted to a ground potential, such that battery 22 applies its voltage $V_{BAT}$ across terminals of power inductor 30. As a result, an inductor current $I_L$ flowing in power inductor 30 may increase during the first phase. As described in greater detail below, a current-mode control circuit 32 may cause inductor current $I_L$ to increase until such point that inductor current $I_L$ reaches a peak current limit (or some other threshold value), as detected by current sensor 34 (e.g., a sense resistor) at which the first phase may end.

In a second phase of the switching cycle of boost converter 20, control circuit 32 may cause switch 28 to be deactivated and switch 29 to be activated. As a result, inductor current $I_L$ may decrease during the second phase as power inductor 30 discharges into boost capacitor 26, boosting the supply voltage $V_{SUPPLY}$ to a voltage higher than battery voltage $V_{BAT}$. In continuous conduction mode (CCM), the second phase may continue until the end of the switching cycle, after which the first phase may occur again. In discontinuous conduction mode (DCM), the second phase may continue until inductor current $I_L$ reaches zero, at which point a third phase of the switching cycle may begin. In the third phase, if it exists, control circuit 32 may cause both of switches 28 and 29 to be deactivated, and inductor current $I_L$ may remain at zero until the beginning of the next switching cycle, in which the first phase may occur again. In some embodiments, control circuit 32 may deactivate switch 29 during the second phase, such that a body diode of the PFET implementing switch 29 conducts inductor current $I_L$ until it reaches zero.

In addition, control circuit 32 may be configured to control switches 28 and 29 in order to, at pre-defined periods of time, implement a dedicated overcurrent detection cycle which is decoupled from the normal switching operation of boost converter 20 described above. During such dedicated overcurrent detection cycle, control circuit 32 may energize power inductor 30 for a pre-determined duration of time by activating switch 28 and deactivating switch 29 in order to increase inductor current $I_L$. During the dedicated overcurrent detection cycle, control circuit 32 may compare inductor current $I_L$ (e.g., measured by current sensor 34) to a pre-determined overcurrent threshold, and may determine an overcurrent condition has occurred (e.g., indicative of a soft short or hard short) if inductor current $I_L$ exceeds the overcurrent threshold during the pre-determined duration of time.

In some embodiments, control circuit 32 may be configured to control an on-switch-resistance of switch 28 (e.g., a resistance of switch 28 when activated) in order to limit inductor current $I_L$ during the dedicated overcurrent detection cycle. For example, in such embodiments, switch 28 may be a "striped" switch comprising a plurality of parallel switch elements (e.g., a plurality of parallel NFET transistors), and control circuit 32 may control an on-switch-resistance of switch 28 by controlling a number of the plurality of parallel switch elements which are activated and deactivated.

In these and other embodiments, control circuit 32 may be configured to dynamically modify the overcurrent threshold as a function of either or both of battery voltage $V_{BAT}$ and supply voltage $V_{SUPPLY}$. Such dynamic modification of the overcurrent threshold may minimize measurement margin due to variation in battery voltage $V_{BAT}$ and/or supply voltage $V_{SUPPLY}$.

In these and other embodiments, control circuit 32 may implement the dedicated overcurrent detection cycle upon powering on of power converter 20 and/or at any other pre-defined instances. For example, control circuit 32 may be configured to repeat the dedicated overcurrent detection cycle whenever power converter 20 becomes idle, either automatically or in response to user configuration or user manual request.

In these and other embodiments, power converter 20 may be implemented as multi-phase power converter 20 in which each converter phase comprises a respective power inductor 30 and switches 28, 29. In such embodiments, control circuit 32 may sequentially perform the dedicated overcurrent detection cycle for each power converter phase upon startup or other pre-defined instance.

Figure 4:
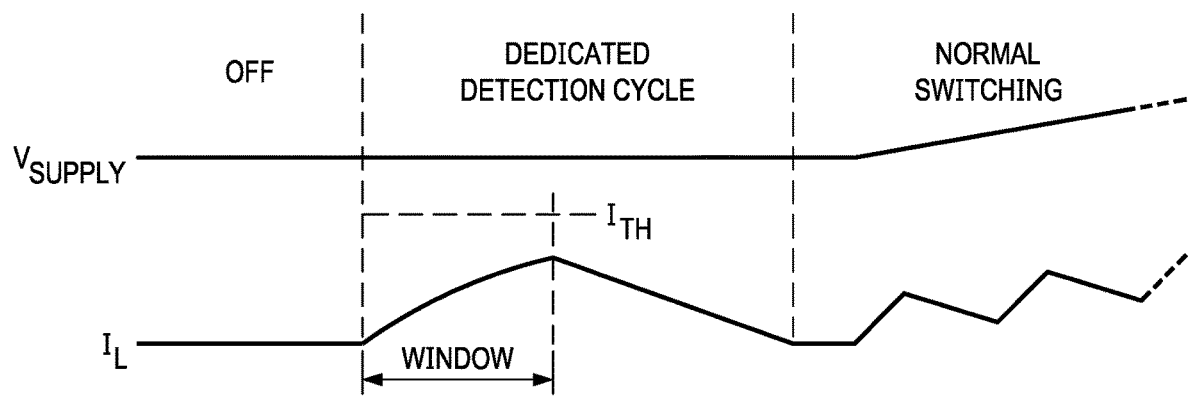
FIG. 4 illustrates a graph depicting an example inductor current waveform in the absence of a short in a power converter, in accordance with embodiments of the present disclosure.

FIG. 4 illustrates a graph depicting an example inductor current waveform $I_L$ in the absence of a short in power converter 20, in accordance with embodiments of the present disclosure. As shown in FIG. 4, power converter 20 may begin in a powered-off state, in which switches 28 and 29 are deactivated. In response to power converter 20 being powered on or re-activated from an idle state, power converter 20 may implement a dedicated overcurrent detection cycle by energizing power inductor 30 (e.g., by activating switch 28 and deactivating switch 29) and determining whether inductor current $I_L$ exceeds a threshold current $I_{TH}$ during a pre-determined duration of time (e.g., indicated by "WINDOW" in FIG. 4). In FIG. 4, inductor current $I_L$ fails to reach threshold current $I_{TH}$ during the pre-determined duration of time, thus indicating an absence of overcurrent condition, and thus an absence of short, in power converter 20. Accordingly, after the pre-determined duration of time has expired, power converter 20 may deactivate switch 28 and activate switch 29, in order to discharge power inductor 30 before beginning normal switching operation of power converter 20 to regulate supply voltage $V_{SUPPLY}$.

Figure 5:
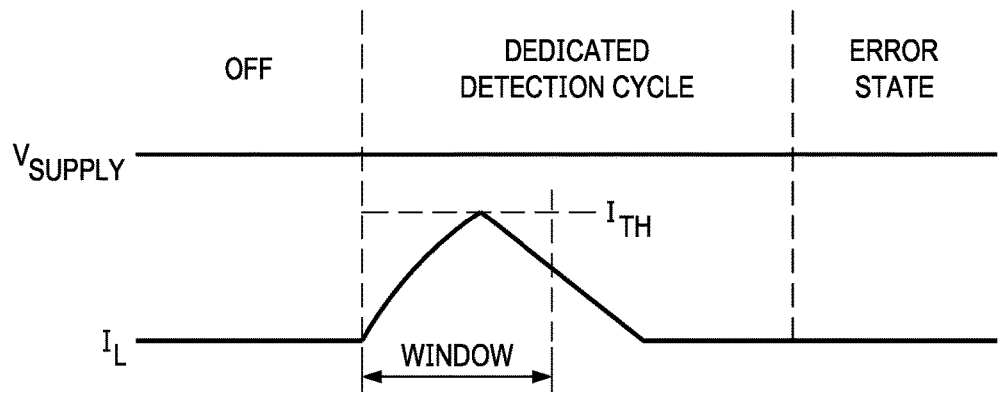
FIG. 5 illustrates a graph depicting an example inductor current waveform in the presence of a short in a power converter, in accordance with embodiments of the present disclosure.

FIG. 5 illustrates a graph depicting an example inductor current waveform in the presence of a short in a power converter, in accordance with embodiments of the present disclosure. In FIG. 5, inductor current $I_L$ reaches threshold current $I_{TH}$ during the pre-determined duration of time, thus indicating a presence of an overcurrent condition, and thus a presence of a short, in power converter 20. Accordingly, once current $I_L$ reaches threshold current $I_{TH}$, power converter 20 may deactivate switch 28 and activate switch 29, in order to discharge power inductor 30 to prevent an actual overcurrent condition. Having detected the overcurrent condition during the dedicated overcurrent detection cycle, control circuit 32 may cause power converter 20 to enter an error state in which switches 28 and 29 are deactivated, and may implement one or more remedial actions (e.g., communication of an alert, continued operation of converter phases unaffected by the short in the case of a multi-phase converter) in response to the overcurrent condition.

In some embodiments, control circuit 32 may be configured to, in response to an overcurrent condition, estimate an inductance L for power inductor 30 by measuring a time t elapsed from beginning of the dedicated overcurrent detection cycle to the instant at which inductor current $I_L$ reaches threshold current $I_{TH}$. For example, inductance L may be estimated in accordance with:

$$1_{TH} = \frac{V_{BAT}}{R_{ON}}(1 - e^{-t/\tau})$$

where $R_{ON}$ is the on-switch-resistance of switch 28 and $\tau$ may be given by $L/R_{ON}$.

Although the foregoing has contemplated detection of shorts within a boost converter circuit, systems and methods identical or similar to those described above may also be applied to buck converters, buck-boost converters, or any other suitable type of current-mode controlled inductive switching converter.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A method for determining if an inductor coupled to a switching network has been electrically shorted, comprising:
    applying a voltage across the inductor for a predetermined period of time;
    controlling an impedance of a switch in an electrical path of a voltage source generating the voltage and the inductor while the switch is activated in order to limit an inductor current through the inductor during the predetermined period of time;
    sensing the inductor current;
    comparing the inductor current with a predetermined current threshold; and
    determining whether the inductor has been electrically shorted based on the inductor current, the predetermined current threshold, and the predetermined period of time.

2. The method of claim 1, further comprising determining the inductor has been electrically shorted if the inductor current reaches the predetermined current threshold during the predetermined period of time.

3. The method of claim 1, further comprising dynamically modifying the predetermined current threshold based on a magnitude of the voltage.

4. The method of claim 1, further comprising dynamically modifying the predetermined current threshold based on a magnitude of the impedance.

5. The method of claim 1, wherein the switching network and the inductor are integral to a power converter.

6. The method of claim 5, further comprising performing the applying, controlling, sensing, comparing, and determining steps when the power converter is idle.

7. The method of claim 5, further comprising periodically performing the applying, controlling, sensing, comparing, and determining steps when the power converter is idle.

8. The method of claim 5, further comprising performing the applying, controlling, sensing, comparing, and determining steps in response to a user setting or user request.

9. The method of claim 1, further comprising estimating an inductance of the inductor by:
    measuring a duration of time for the inductor current to reach the predetermined current threshold; and
    estimating the inductance based on the duration of time, the impedance, and the voltage.

10. A method for estimating an inductance of an inductor, comprising:
    applying a voltage across the inductor for a maximum period of time;
    controlling an impedance of a switch in an electrical path of a voltage source generating the voltage and the inductor while the switch is activated in order to limit an inductor current through the inductor during the predetermined period of time;
    sensing the inductor current;
    measuring a duration of time for the inductor current to reach a predetermined current threshold; and
    estimating the inductance based on the duration of time, the impedance, and the voltage.

11. A system for determining if an inductor coupled to a switching network has been electrically shorted, comprising:
    an input for sensing an inductor current through the inductor; and
    a control circuit configured to:
        apply a voltage across the inductor for a predetermined period of time;
        control an impedance of a switch in an electrical path of a voltage source generating the voltage and the inductor while the switch is activated in order to limit an inductor current;
        compare the inductor current with a predetermined current threshold; and
        determine whether the inductor has been electrically shorted based on the inductor current, the predetermined current threshold, and the predetermined period of time.

12. The system of claim 11, wherein the control circuit is further configured to determine the inductor has been electrically shorted if the inductor current reaches the predetermined current threshold during the predetermined period of time.

13. The system of claim 11, wherein the control circuit is further configured to dynamically modify the predetermined current threshold based on a magnitude of the voltage.

14. The system of claim 11, wherein the control circuit is further configured to dynamically modify the predetermined current threshold based on a magnitude of the impedance.

15. The system of claim 11, wherein the switching network and the inductor are integral to a power converter.

16. The system of claim 15, wherein the control circuit is further configured to perform the applying, controlling, comparing, and determining steps when the power converter is idle.

17. The system of claim 15, wherein the control circuit is further configured to periodically perform the applying, controlling, comparing, and determining steps when the power converter is idle.

18. The system of claim 15, wherein the control circuit is further configured to perform the applying, controlling, comparing, and determining steps in response to a user setting or user request.

19. The system of claim 11, wherein the control circuit is further configured to estimate an inductance of the inductor by:
    measuring a duration of time for the inductor current to reach the predetermined current threshold; and estimating the inductance based on the duration of time, the impedance, and the voltage.

20. A system for estimating an inductance of an inductor, comprising:
- an input for sensing an inductor current through the inductor; and
- a control circuit configured to:
  - apply a voltage across the inductor for a maximum period of time;
  - control an impedance of a switch in an electrical path of a voltage source generating the voltage and the inductor while the switch is activated in order to limit the inductor current;
  - measure a duration of time for the inductor current to reach a predetermined current threshold; and
  - estimate the inductance based on the duration of time, the impedance, and the voltage.

* * * * *